United States Patent [19]

Best

[11] Patent Number: 4,855,827

[45] Date of Patent: Aug. 8, 1989

[54] METHOD OF PROVIDING IDENTIFICATION, OTHER DIGITAL DATA AND MULTIPLE AUDIO TRACKS IN VIDEO SYSTEMS

[75] Inventor: Robert J. Best, San Jose, Calif.

[73] Assignee: Worlds of Wonder, Inc., Fremon, Calif.

[21] Appl. No.: 76,036

[22] Filed: Jul. 21, 1987

[51] Int. Cl.$^4$ .............................................. H01N 7/04
[52] U.S. Cl. .................................... 358/143; 358/142
[58] Field of Search ............... 358/142, 143, 144, 145, 358/147

[56] References Cited

U.S. PATENT DOCUMENTS

4,318,125  3/1982  Shutterly ............................. 358/145
4,321,623  3/1982  Rzeszewski ......................... 358/145

Primary Examiner—Edward L. Coles, Sr.
Assistant Examiner—Michael D. Parker
Attorney, Agent, or Firm—Blakely, Sokoloff, Taylor & Zafman

[57] ABSTRACT

A method and apparatus for imbedding digital data and multiple audio (analog) track information in a video signal in a manner compatible with ordinary broadcast TV and transparent to a conventional television receiver is disclosed. The method and apparatus may provide multiple independent audio tracks and a substantial level of interaction with a viewer utilizing special reception equipment, which equipment may be utilized to provide a fully interactive system from signal sources not required to be compatible with convention receivers. The method and apparatus includes the ability of imbedding both analog and digital signals in a video signal, and while advantageous for interactive TV systems, may be used for a multitude of purposes in various video systems.

43 Claims, 6 Drawing Sheets

METHOD OF PROVIDING IDENTIFICATION, OTHER DIGITAL DATA AND MULTIPLE AUDIO TRACKS IN VIDEO SYSTEMS

BACKGROUND OF THE INVENTION

1. Field of the Invention

The present invention relates to the field of video systems.

2. Prior Art

Work has been done on various types of video systems whereby a viewer may interact with the video programming being presented. While a system could readily collect data provided by the viewer during programming such as, by way of example, yes, no or multiple choice answers to questions presented during the viewing, which answers could readily be correlated with the time of the responses during the programming for scoring and/or other evaluation, the ultimate goal in such systems is to have the further programming itself respond to or be dependent upon a prior viewer response or responses so that the viewer truly interacts with what he is being shown to determine what will subsequently be viewed. By way of example, in the case of educational materials, a problem might be presented by way of a video picture and supporting audio, with the viewer's solution to the problem resulting in a notation that the answer was correct, followed by the presentation of the next problem or, in the alternative, an indication that the answer was wrong and an explanation of why the answer was wrong. Depending upon the number of paths or tracks which are possible, the degree of difficulty of the following problem may be based upon the accuracy of the preceding answers, so that better students will not be bored by a lack of challenge, and lesser students will not be frustrated by the lack of results. In the case of entertainment, a truly interactive system will allow viewer's responses to affect one or more succeeding storyline segments to the viewer's amusement, with or without scoring as the case may be.

In video disc systems, the video and audio signals are stored on circular tracks on the video disc, two fields or one full frame per track. For ordinary programming the pickup head is advanced to the next track during the vertical retrace so that there is no interruption of the material being viewed. Since the pickup head potentially may be moved anywhere, various types of interactive video systems based on video disc technology have been proposed. However, the extent of head motion without momentary loss of signal is limited, though improvements are being made in that regard, and a momentary loss of picture in educational systems may be acceptable. In general for each jump, the fields for the sequence jumped to are presented sequentially, together with the audio information therefor, so that no problem is encountered in providing the audio associated with that video sequence. However, interactive video disc systems by their nature depend on the ability to determine the audio and video signals by physical selection of the tracks on the video discs, and thus by controlling the video signal itself. Consequently, this technology is not transferable to over the air programming and is not applicable to sequential recording and playback systems, particularly video cassette recorders currently in use in large numbers.

Finally, any video sequence may be altered at any point by overlaying or substituting computer graphics therefor. However, while this is useful for special effects and short term changes, very definite limitations are encountered in terms of resolution, real time animation and the amount of data which can be accumulated in the computer for the display.

The assignee of the present invention has developed methods and systems which allow the interleaving of fields from multiple story lines, with a field of a selected story line being stored in a refresh memory until the next field of that story line is presented in the video signal. Certain signal segments may consist of a single story line, which then may branch to multiple lines, with those in turn branching to additional multiple lines, etc., or converging to lesser numbers of story lines as desired. Consequently, on viewing, the viewer will view a complete story line made up of story line segments determined by the viewer's response at various times throughout the program, which responses determine which of the multiple story line segments are concatenated to form the resultant overall story line. In such a system one could use the left and right stereo channels as two independent audio channels, though in general one would like to be able to select between more than two channels at various times. Also, such an arrangement would not provide any ability to imbed digital data of various forms in the signal such as might be useful for graphics commands, branch point identifications, number of story lines to be selected from, etc. Also, while a signal comprising multiple interleaved story lines would not be compatible with an ordinary TV receiver, it is desirable to have the capability of multiple audio story lines and digital data of various forms imbedded in the TV signal in such a way as to not interfere with the reception of the main story line on an ordinary receiver, whereby a TV broadcast signal compatible with ordinary receivers and broadcast techniques may provide at least some of the interactive capabilities when received on the special equipment also usable for a full interleaved interactive video system.

Thus, a main object of the present invention is to provide a means for imbedding digital data and multiple audio (analog) track information in a video signal in a manner compatible with ordinary broadcast TV and transparent to a conventional television receiver, but which may provide multiple independent audio tracks and a substantial level of interaction with a viewer utilizing special reception equipment, which equipment may be utilized to provide a fully interactive system from signal sources not required to be compatible with conventional receivers. This and other objects of the invention will become apparent from the description to follow.

BRIEF SUMMARY OF THE INVENTION

A method and apparatus for imbedding digital data and multiple audio (analog) track information in a video signal in a manner compatible with ordinary broadcast TV and transparent to a conventional television receiver is disclosed. The method and apparatus may provide multiple independent audio tracks and a substantial level of interaction with a viewer utilizing special reception equipment, which equipment may be utilized to provide a fully interactive system from signal sources not required to be compatible with convention receivers.

The method and apparatus includes the ability of imbedding both analog and digital signals in a video signal, and while advantageous for interactive TV systems, may be used for a multitude of purposes in various video systems.

BRIEF DESCRIPTION OF THE DRAWINGS

FIGS. 6a and 6b are block diagrams of a multi channel data recovery system illustrative of a recovery system that might be used at a television receiver, of which FIG. 6a is a left side portion and FIG. 6b is a right side portion.

DETAILED DESCRIPTION OF THE INVENTION

In order to provide specificity in the description to follow, it will be assumed that it is desired to imbed four separate audio tracks, together with digital data, into a video signal in a manner which is compatible with ordinary broadcast and cable TV equipment, which may be recorded and played back on conventional VCRs and the like, which is transparent to conventional television receivers even if the signal originates from or has been temporarily recorded on conventional video recording equipment, and which will be readily detectable, separable, etc. in interactive video and other equipment as desired. While the words "audio" and "digital" are used in the description to follow, it should be noted that both are used in the most general sense and thus are essentially interchangeable. In particular, the word "audio" is used to denote an analog signal in the sense of being relatively well behaved and not quickly changing from extreme to extreme. In the frequency domain, such a signal is characterized as having upper frequency limits which are relatively low in comparison to the band pass of the system. In a time domain, even for a sampled audio signal, the rate of change of the signal in comparison to the sample rate is relatively low, so that the amount of change of the signal between samples is only a small part of the total allowable signal swing. A digital signal, on the other hand, is just the opposite, in that the change between successive signals may be the full maximum swing allowable. In binary digital systems, the change between any two successive signals will either be 0 or the full maximum allowable swing. In other digital systems, additional states may also be allowed, such as, by way of example, in a trinary system, a midpoint state might also be allowed. Obviously the number of states used for information communication may range from two in a binary system to an infinite number for a proportional system, any of which the present invention may accommodate by appropriate coding and recovery circuits. Regardless of the number of allowable states in the digital signal however, such a signal is characterized for purposes of the present disclosure as having sample points which have the capability of having any value within the full signal range, independent of the preceding and succeeding data point. In that regard, the preferred embodiment disclosed herein is intended to be used for communication of binary digital data, and accordingly will be described in such a context.

In the United States a conventional television signal is comprised of an audio signal and a video signal, both of which for transmission purposes are modulated on an appropriate television carrier. The video signal is an amplitude modulated signal on a 1.25 MHz carrier, having an upper side band approximately 4 MHz wide and a lower side band truncated at approximately 0.5 MHz. Within this video band is a color subcarrier at 3.579545 MHz, (approximately 3.58 MHz) above the 1.25 MHz video carrier, the color subcarrier being quadrature amplitude modulated by inphase and quadrature color component signals which may be combined with the basic video signal to provide three color signals for color television transmission and reception. The carrier frequency for the frequency modulated audio signal is 4.5 MHz above the video carrier of 1.25 MHz, and thus is outside the frequency band of the video signal. Since in the present invention it is desired to provide for the storage, transmission, reception, etc., of multiple audio tracks without interfering with the reception, both audio and video, of a conventional television receiver, the present invention does not in any way utilize the conventional audio channels associated with a conventional broadcast. Instead, the multiple audio channels are included as part of the video signal in a manner transparent to conventional broadcast, recording, playback and receiver equipment.

In a conventional television, the video information is presented at the rate of 30 frames per second, each frame comprising 525 scan lines. Each frame is comprised of two successive fields, one comprising the odd numbered frame lines and the other comprising the even numbered frame lines, the fields being interlaced in that manner to provide the full respective frame. Each line of each field is generated by a raster sweeping horizontally at a uniform rate by way of operation of a horizontal oscillator generating a ramp function. A periodic horizontal sync signal transmitted as part of the video signal resets the ramp generator at a time when the video signal is held black (actually lower than black, frequently referred to as blacker than black), after which the next raster scan line of that respective field is initiated. A vertical oscillator, also serving as a ramp generator, moves the raster downward at a uniform rate so that each line of each field is very slightly, but not noticeably inclined. Each 262 ½ lines a vertical sync signal is provided as part of the video signal to reset the vertical oscillator to initiate the next field, either the second field of one frame to complete that frame or the first field of the next successive frame. As with the horizontal sync signal, the signal is held black during vertical retrace so as to not disturb the viewable image In the case of color television, each horizontal sync signal is followed by a "color burst" signal, specifically an unmodulated but properly phased burst of the 3.58 MHz subcarrier of at least 8 cycles minimum to correct any phase errors in the local subcarrier oscillator of the television receiver accumulated during the preceding line. After each color burst signal the local 3.58 MHz oscillator is free-running for the remainder of the line, being of sufficient accuracy to allow the accurate phase demodulation of the quadrature amplitude modulated chroma signal.

Thus it may be seen from the above that while in theory a television picture is comprised of successive frames each of 525 lines, in practice, some of these lines are blanked for vertical retrace, and a portion of each remaining line is blanked for horizontal retrace and further, is not available for active video during the color burst signal. Consequently, the number of active video lines is only 484, with only approximately 83% of each line period being available for active video information. Further, for the active lines, not all such lines are viewable or even intended to be viewable. Accordingly, these lines are sometimes used for other information. By way of example, some of the upper lines are sometimes used by the networks themselves to provide information to other network stations. These lines are generally lines above line 21 of each field, line 21 generally being set aside for closed caption broadcasts.

Line 22 on down normally contains active video information, and in that context may be considered viewable. However, a reasonably well adjusted conventional television receiver will display an image which is somewhat smaller than the full active video region and accordingly, the first active video line which will actually be viewed on a television receiver will be substantially below line 22. In essence, the viewed image may be considered as a window to a significantly larger active video area, the important thing for the present invention being the fact that there are a number of lines of active video not viewed on conventional receivers in good working order. Thus, in accordance with the present invention, the audio and digital signals to be imbedded in the video signal are imbedded in the active portion of lines 22 through 29 so as to be storable on ordinary video equipment, compatible with studio and transmission processing equipment such as time base correctors and the like, capable of distribution through ordinary over-the-air broadcasting and cable television systems and readily detectable by special equipment, all without interfering with a display of the normal video signal and associated audio channels on a conventional television receiver.

Figure 1:
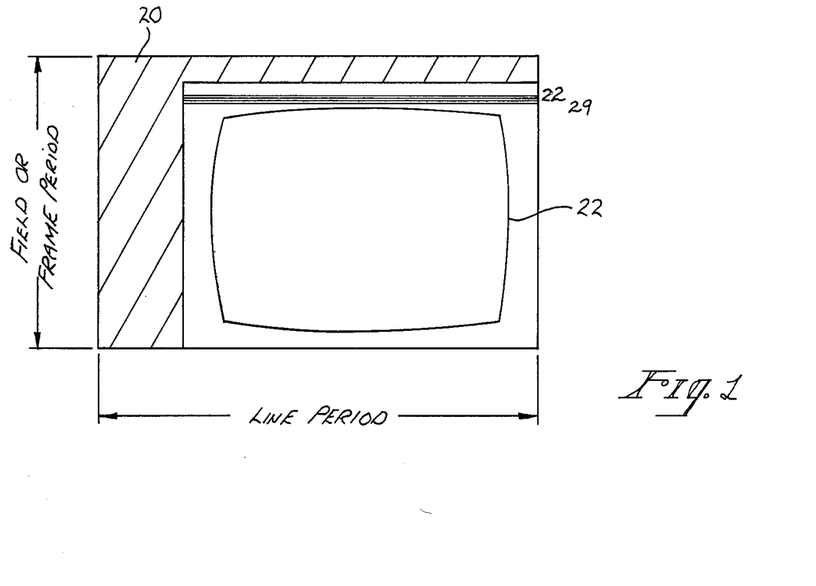
FIG. 1 is a diagram illustrating the active and inactive portions of a video signal with a television receiver screen laid thereover to indicate the viewable portion of the signal.

The foregoing is illustrated in FIG. 1. In this figure, the horizontal distance represents the line period or time for the raster scan for each line, approximately 63.5 microseconds. The vertical dimension represents the field or frame period, each field and the resulting frame being blanked in the same regions for the same percentage of time. In that regard, the shaded region 20 represents the period during which the signal is blanked for horizontal and vertical retrace. The unshaded portion represents the active video region, with the window 22 representing the typical window of a conventional receiver to the active region. As may be seen, lines 22 through 29 are adjacent the top of the active video region, but above the typical window of a conventional receiver, whereby information contained thereon as part of the video signal ill not be viewable on a conventional receiver as part of the viewable image.

In accordance with the preferred embodiment of the present invention, the multiple audio channels and the digital data are contained in each field of the video signal so that they may be recovered in a predetermined manner independent of the program content, whether broadcasting a single video story line or providing multiple interleaved video story lines from a video tape player. In particular, the first analog track is stored in lines 22 and 23, the second in lines 24 and 25, the third in lines 26 and 27, and the fourth in lines 28 and 29. Digital data, on the other hand, is stored 8 bits per line for each of lines 22 through 29, thereby simultaneously providing an 8 byte block data capability for each field.

Since the analog information for any given track as stored on two lines of a field may represent the audio signal persisting for the entire field, some form of audio compression for recording and transmission purposes and method of recovery at the receiver is required. For this purpose the audio signal for a given track is sampled at a given rate, with each sample being digitized through an analog to digital converter and sequentially stored in digital form for subsequent playback. Then these stored digital signals may be played back and converted to analog form in higher speed bursts as required for compressing an entire field's worth into the two lines of video information. In the preferred embodiment, an integer number of samples per line, specifically three, are used (though other numbers of samples per line may also be used as desired, such as 1 or 2 samples per line). Since the line repetition rate is 15,750 per second, this provides a sample rate of 47.25 KHz, or in theory, the ability to reproduce frequencies up to 23.625 KHz. In practice of course some filtering or signal smoothing will be used, not only at the input end but upon recovery, though clearly the bandpass capabilities of such a sample rate are adequate for the reproduction of good audio quality sound. With three samples per line one obtains 1,575 samples per frame, a number not divisible by two for equal apportioning between the two fields, and of course not further divisible by two for apportioning between the two lines of storage in each field For convenience, the three sample points for the audio track for the first 131 lines of the respective fields are imbedded on the first line for that audio track, namely line 22 for the first audio track, and the three sample points for each of additional 131 or 132 lines, dependent upon whether the respective field is an even or odd numbered field as indicated by the relative positions of the horizontal and vertical sync pulses, are stored on the next line. Thus in one field, the two lines having imbedded therein one analog signal will have a signal comprised of three sample points for each of 262 lines, and for the next field will have three sample points for each of 263 lines, giving for the two fields combined, three sample points for the total 525 lines per frame. Obviously, while not all lines are viewable or viewed as stated before, an audio signal must be continuous field-to-field and frame-to-frame throughout all portions of all lines, viewed, viewable or containing sync signals or other information. Further, in the preferred embodiment, some slight overlap of the compressed information on each analog track is provided by the duplication of the analog information at each end of the storage thereof on a respective video line. This has the advantage of avoiding major discontinuities in the event of slight inaccuracies in the recovery of the sample time at the receiver unit.

Figure 2:
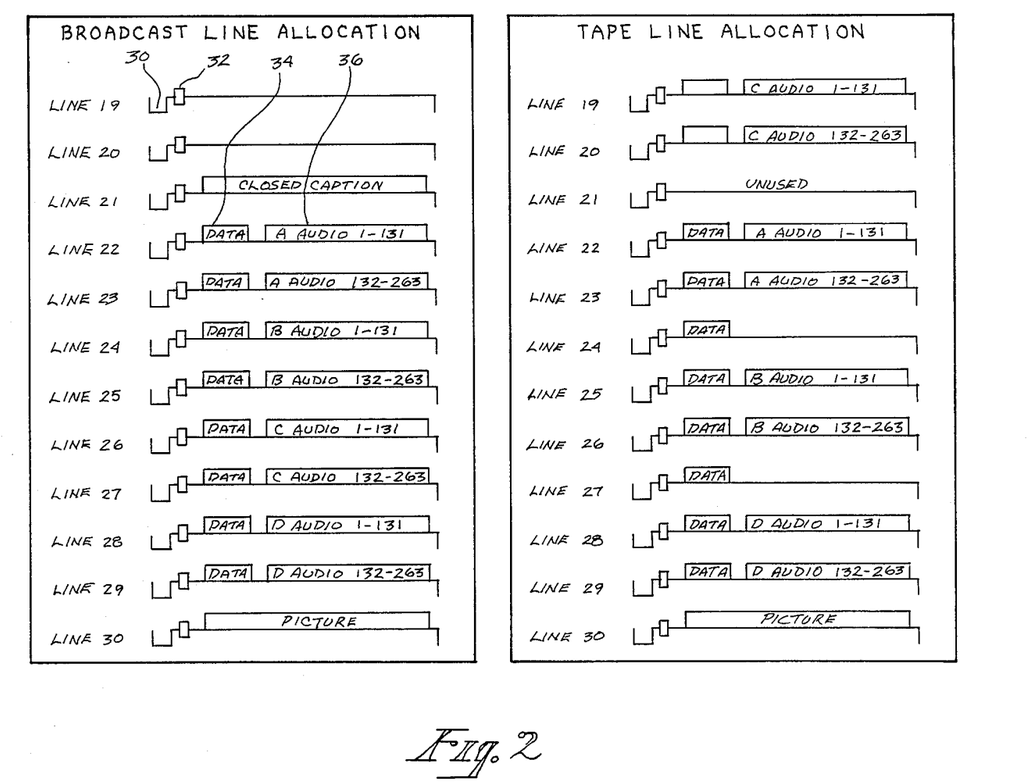
FIG. 2 is a diagram illustrating the digital data and compressed audio allocation of the present invention.

Now referring to FIG. 2, a chart showing the foregoing line allocation may be seen. The chart actually is for the field wherein the second line of audio information contains audio information for 132 lines, specifically lines 132 through 263. As schematically shown in FIG. 2, the luma signal for each line contains first the vertical sync signal 30, a blacker than black voltage level, followed by the color burst 32, then the digital information generally indicated by the numeral 34, followed by the analog information generally indicated by the numeral 36. The line allocation shown of course is for the field in which the second line of each audio channel represents 132 sample points, the alternate fields only having 131 sample points on each line. As indicated in the figure, picture information starts on line 30, with most receivers displaying a picture starting approximately on that line. Also, as indicated, lines above line 22 are unused in the present invention and are thus available for whatever uses are desired.

As previously pointed out, the subcarrier with the chroma signal is 3.579545 MHz and of course is phase locked to the color burst signal in the receiver for each line, being readjusted for phase wander by the color burst signal for each successive line. This corresponds to 227.5 cycles of the subcarrier per scan line. As such, it is used in the present invention as a reference frequency for recovery of the analog signal samples, and thus of course for the initial imbedding of the analog signals in the respective lines 22 through 29. More particularly, the subcarrier signal as recovered in the receiver and realigned on each scan line by the color burst signal is merely squared up to provide a high third harmonic content, and then filtered to pick out the third harmonic thereof, providing 682.5 cycles per line, or approximately 565 cycles in the active video portion of each line. Since only at most 396 samples per line are used (plus overlap), it will be apparent that only some portion of the active video portion of the respective lines are required, allowing some separation between the end of the color burst signal and the first digital information, as well as leaving the majority of the line for the analog data. This assures that studio and transmission processing equipment, particularly time base correctors do not strip off any of the desired information or reference signals.

The digital data itself, as previously mentioned, may be considered as sample points unrelated to the preceding or succeeding sample points Accordingly, the data rate used in the present invention is substantially lower than the repetition rate of the sample points for the analog signal. As before, the digital data is synced to the subcarrier frequency, though the data rate is only one fourth the frequency of the subcarrier This allows the accurate recovery of the data without undue accuracy requirements in the sampling time for the data recovery Now referring to FIG. 3, further details of the present invention may be seen. In this figure, the wave form of the first and second lines for any of the four analog channels A through D, together with the precise timing thereof for the preferred embodiment, may be seen. Horizontal blanking, including the horizontal sync signal 30 and the color burst signal 32 end 34 subcarrier cycle counts after the beginning of the horizontal blanking interval For convenience herein, subcarrier counts will be abbreviated as SCC because of the repetitiveness with which they are referred to. After the color burst 32, the signal returns to the black or zero IRE level at the end of the horizontal blanking interval. Shortly thereafter the signal level ramps upward, passing through +50 IRE 4 SCC after the end of the horizontal blanking interval, and reaching +100 SCC and holding that value for a significant length of time. This is referred to in FIG. 3 as the reference pedestal, the +100 IRE level being held for nearly 8 SCC to allow the settling and the averaging out of any noise in that signal by the recovery circuitry to provide a reference level for automatic gain control (AGC) reference purposes.

Figure 3:
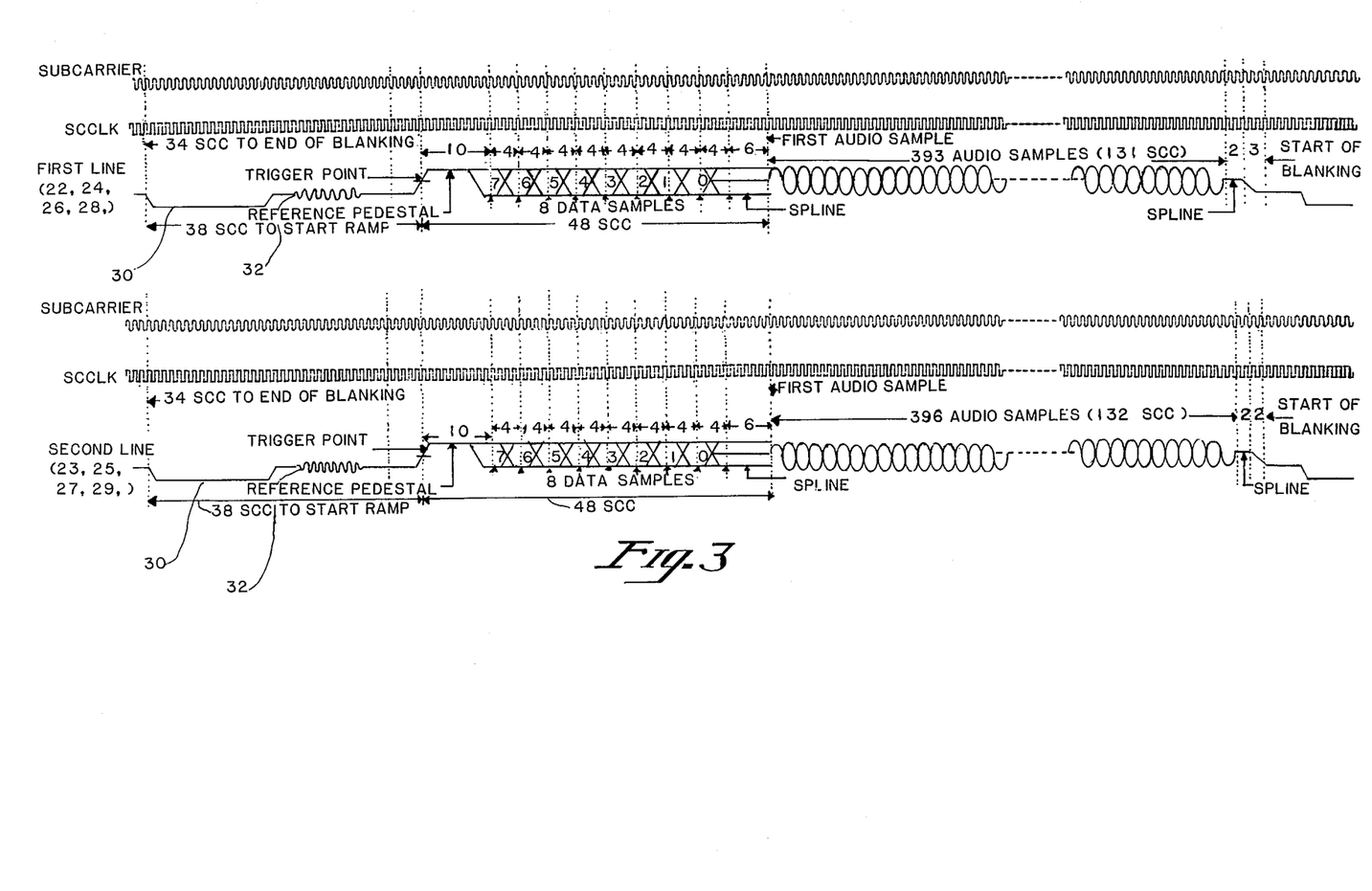
FIG. 3 is a video wave form diagram illustrating further details of the placement of the digital data and compressed analog signals on typical video scan lines.

Thereafter the eight data bits are clocked out, each 4 SCC wide with the center of the first bit, bit 7, occurring 10 SCC after the +50 IRE trigger point in the ramp up to the reference pedestal level. The precise timing of the +50 IRE trigger point relative to the subsequent digital data and analog information is important, as on recovery, the +50 trigger point is used as the timing reference for the subsequent start of sampling of the digital data and the analog information for recovery purposes. (While time in the absolute sense may be used, time in terms of the number of subcarrier cycles (SCC) may also be used.) After the last data bit, bit 0, a 6 SCC wide spline region is provided, after which the analog samples are clocked out, 3 per SCC, followed again by a 2 SCC wide spline region, returning thereafter to the black level in readiness for the next horizontal sync signal. The purpose for the spline regions is to accommodate small errors in timing between the formation of the signal with the analog samples thereon and the recovery thereof. In particular, if the recovery timing is either early or late, there will be some slight timing shifts in the majority of the analog signal recovered. Of primary importance however, is the data sensed at the ends, as early sampling on the recovery before the actual analog signal is present could yield wildly erroneous analog values, as could sampling late after the entire analog signal for that line has been completed. To avoid this problem the spline region is provided at each end of the analog signal.

Ideally, sample points corresponding to the beginning of the next line for that analog channel should be provided at the end of any given line, with the beginning of a line repeating the sample points given at the end of the proceeding line for that analog channel Such an arrangement would very slightly shift the timing of the analog information, though otherwise would accurately reproduce the analog signal for a constant lead or a constant lag in the analog signal recovery timing. However, in the preferred embodiment, the first analog sample value is replicated during the lead-in spline region, with the last sample point of the line replicated during the 2 SCC wide trailing spline region. Since a substantial part of the error in recovery timing in comparison to the ideal is in the form of a jitter rather than in a constant offset, and little signal change occurs between adjacent sample points anyway, the replication of the first and last sample value in this manner results in very little signal degradation, and substantially simplifies the makeup of the signal by not requiring the carryover of sample values from line to line.

For the first line, the 393 samples are clocked out over 131 SCC following the lead-in spline, three samples per SCC using the third harmonic thereof as a reference. The signal swing itself is symmetrical about the +50 IRE point, having an upper limit of +100 IRE and a lower limit of 0 IRE, so that the analog signal itself, dependent upon its form, will not be misinterpreted on reception as one of the sync signals. At the end of the analog signal the signal level returns to the 0 IRE level in readiness for the next horizontal sync pulse. For the second line of the same analog channel, the timing is identical except for the fact that for every other field, the second line contains 396 samples clocked out over 132 SCC, thereby extending the analog signal by 1 SCC.

Figure 4:
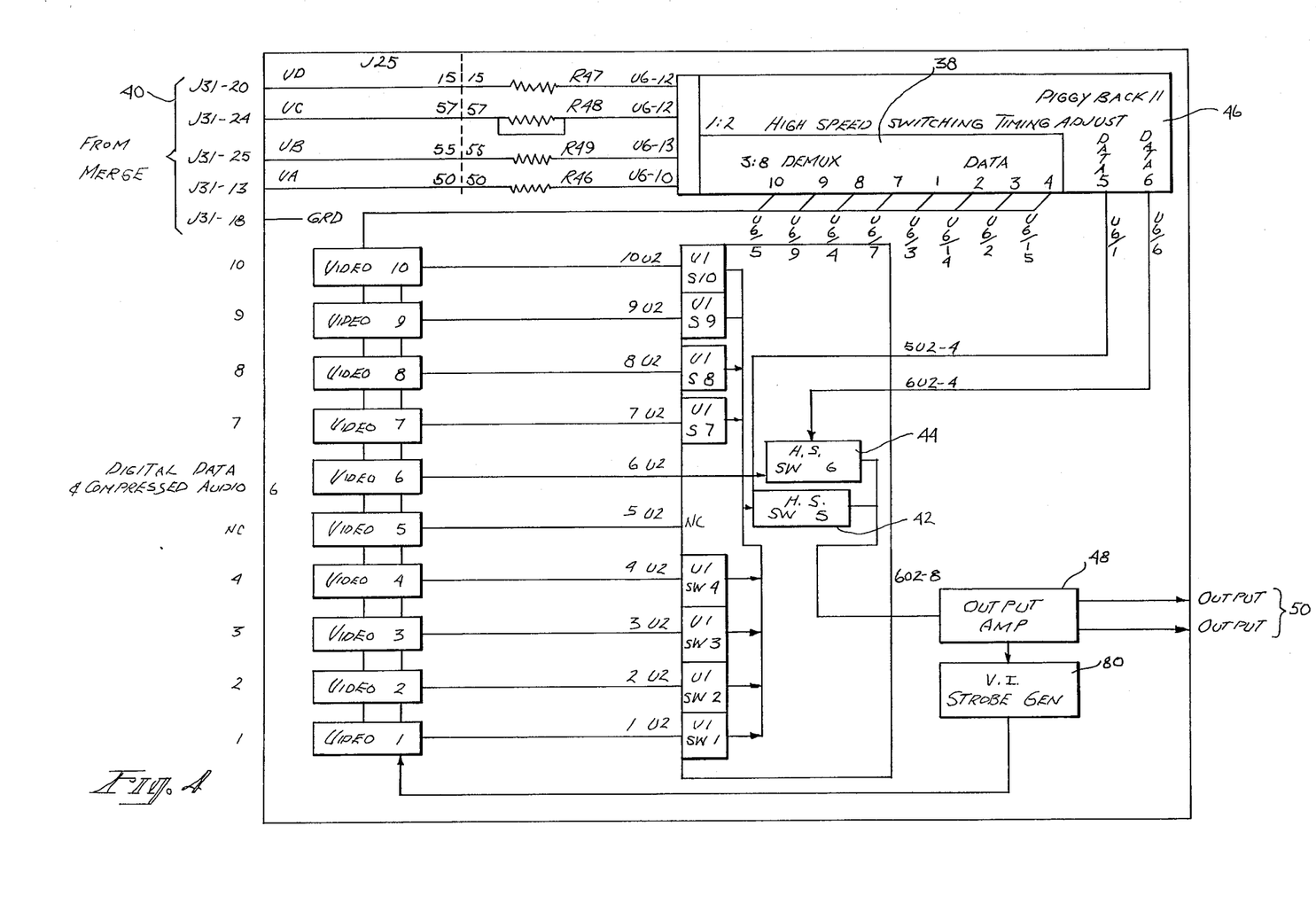
FIG. 4 is a block diagram of a switching circuit used to combine video signals and digital and compressed analog signals in accordance with the present invention.

Now referring to FIG. 4, a block diagram of the switching circuit used to make up the video signals for recording or transmission in accordance with the present invention may be seen. While the switcher may take many forms, the one illustrated is a modified Grass Valley Group switcher TEN-XL. This switcher has ten video channels numbered video 1 through video 10, though in the embodiment shown the video 5 channel is not used. Of the other remaining nine channels, all except the video 6 channel are controlled through a one of eight demultiplexer 38, which decodes three of the four control lines 40 to select one of the eight video channels at any one time. These eight video signals have all been pre-synced to a "station sync" in accordance with procedures and equipment well known in the video communications industry. The output of the eight video channels, or more appropriately the selected one of the eight, is directed to a high speed switch 42. At the same time the sixth channel (video 6) is directed to a high speed switch 44, with the fourth of the control lines 40 controlling the one of two demultiplexer for selecting either switch 42 or switch 44 to couple the input thereto through the output amplifier 48 to provide the two buffered outputs on lines 50. The input through the video 6 channel to the high speed switch 44 is the digital data 34 and compressed audio signal 36 (see FIGS. 2 and 3). Accordingly, by control of the high speed switches 42 and 44, a selection is made between the selected video channel determined by the other three control lines, and the digital data and compressed audio signal. Thus, it may be seen that if high speed switch 44 is always selected for video lines 22 through 29, and never selected for any other lines, the digital data and compressed audio will in effect always be laid over lines 22 through 29 for each field of each frame for whatever video signal is selected out of the eight selectable video channels.

Figure 5:
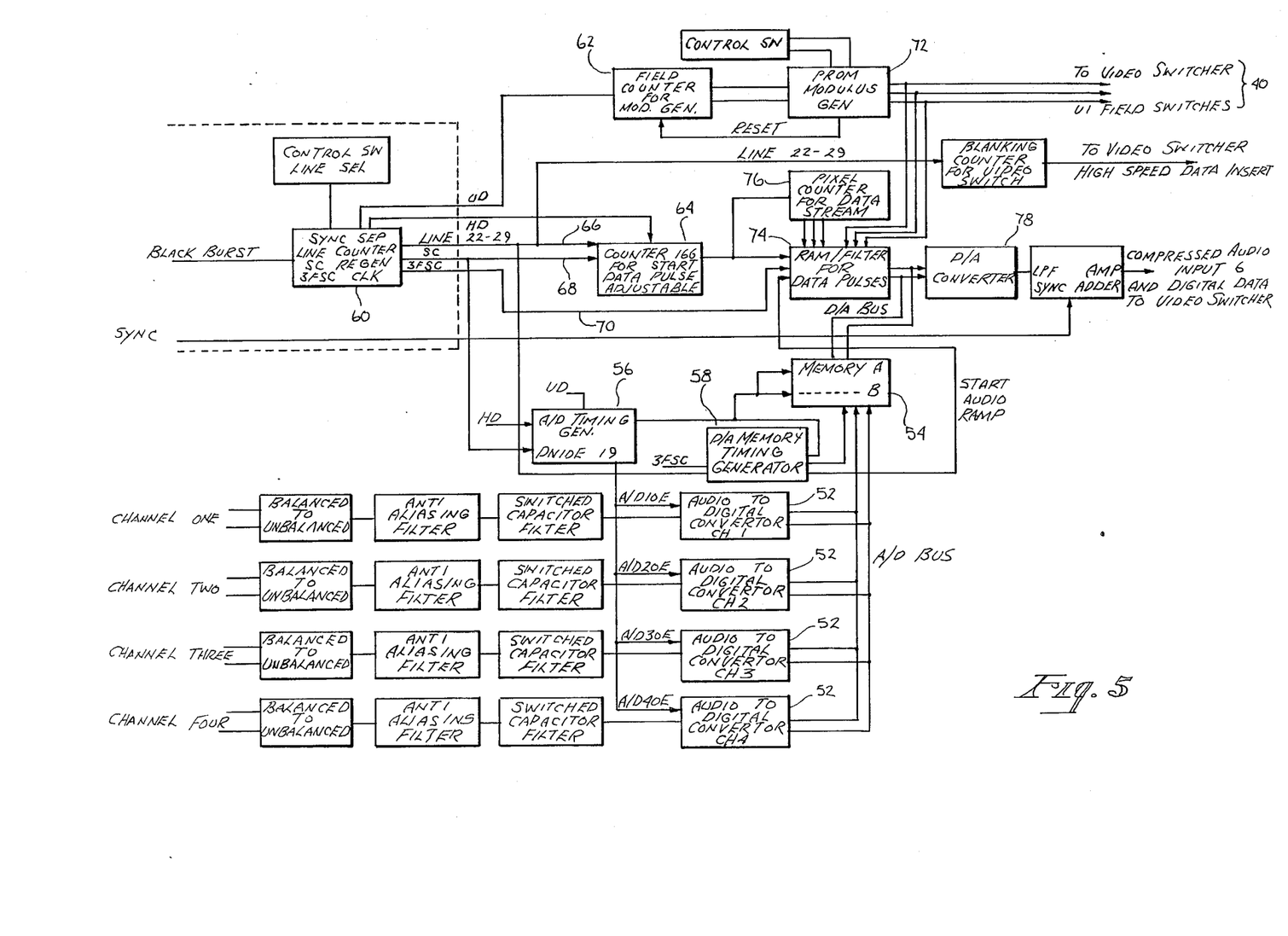
FIG. 5 is a block diagram illustrating the circuits used to make up the compressed audio and digital information.

Now referring to FIG. 5, a block diagram of the system used to make up the digital data and compressed audio signal and the control signals to be provided to the circuit of FIG. 4 may be seen. The specific circuit disclosed will handle up to four audio (analog) channels, numbered channel one through channel four. For each of the four channels, the balanced audio signal is first converted to an unbalanced signal, passed through an antialiasing filter, further switch capacitor filtering and then an analog to digital converter 52 to provide a digitized audio signal to a memory 54. The analog to digital converters 52 are controlled by an analog to digital timing generator 56, with the memory itself being controlled by a memory timing generator 58. The memory 54 is divided or partitioned into two sections, an A section and a B section. During any field time one section of the memory is being loaded with the digital data and digitized analog data for the four channels, while at the same time the data stored during the prior field time is being clocked out at the appropriate rate and time so as to be properly positioned and compressed on the field scan lines 22 through 29.

For control of the foregoing process a black burst signal is provided to a sync separator and line counter 60 which provide a vertical sync signal to a field counter 62, a horizontal sync signal to a counter 64 for the start of the data pulses, a signal on line 66 indicative of lines 22 through 29, a subcarrier signal on line 68 and finally the third harmonic thereof on line 70. The field counter 62 provides a count to a modulus generator PROM 72 which provides as an output the three control signals on lines 40 to control the one of eight demultiplexer 38 shown in FIG. 4, and further provides an output signal as a reset signal to reset the field counter 62 when the current modulus has been reached. In essence the field counter is only reset to start counting over again when the desired modulus has been reached. In any particular instance the modulus may be relatively high, as certain video channels might not be repeated very frequently. By way of specific example, for a live sporting event one video channel might be devoted to a shot of the score board so that a viewer may see the score at any time by momentarily selecting that channel or track for viewing for a moment. For such a purpose that video channel might only be updated (selected for broadcast) perhaps once a second which, if this was the least frequently updated channel, would set the modulus at 60. Some of the other tracks might be devoted to recent close plays to be shown in slow motion and might be updated more frequently. One track might be used for the primary video action and might be updated, for instance, every other field. While the system shown in FIG. 5 is representative of a system wherein the modulus generating PROM 72 is preset for the broadcast and/or recording of a "program", obviously the modulus generator could be dynamically altered as desired while the program progresses, a function easily accomplished by the use of a microcomputer and appropriate controls in place of the PROM modulus generator.

In the embodiment shown the digital data is actually an identification of the video channel of the next field, namely the signals on lines 40 which are decoded by the demultiplexer 38 of FIG. 4, and an identification of the associated audio channel. A ramp generator and filter 74 for the data pulses is controlled by counter 64 and a pixel counter 76 to provide the ramp at the lead-in to the reference pedestal (see FIG. 3) preceding the digital data, and to then provide the digital data to the digital to analog converter 78. Actually in the preferred embodiment four bits are used to identify the video channel, with three additional bits being used to identify the associated audio channel. Also, since this information is contained within the video signal itself, it is convenient two have such information as contained in any given field identify the video and audio channels not for that field but for the next successive field. This is accomplished by the circuit of FIG. 3 through the vertical blanking interval strobe generator 80 which only switches to the commanded video channel on the next vertical blanking interval.

After the digital data is provided to the digital to analog coverter 78 the audio or analog samples are output to digital to analog converter 78 by memory 54, with the appropriate timing in accordance with FIG. 3 at the three SCC rate. The output of the digital to analog converter is compressed audio and digital data for lines 22 through 29 which, after adding the horizontal sync signal, provides the full signal for these eight lines.

Figure 6B:
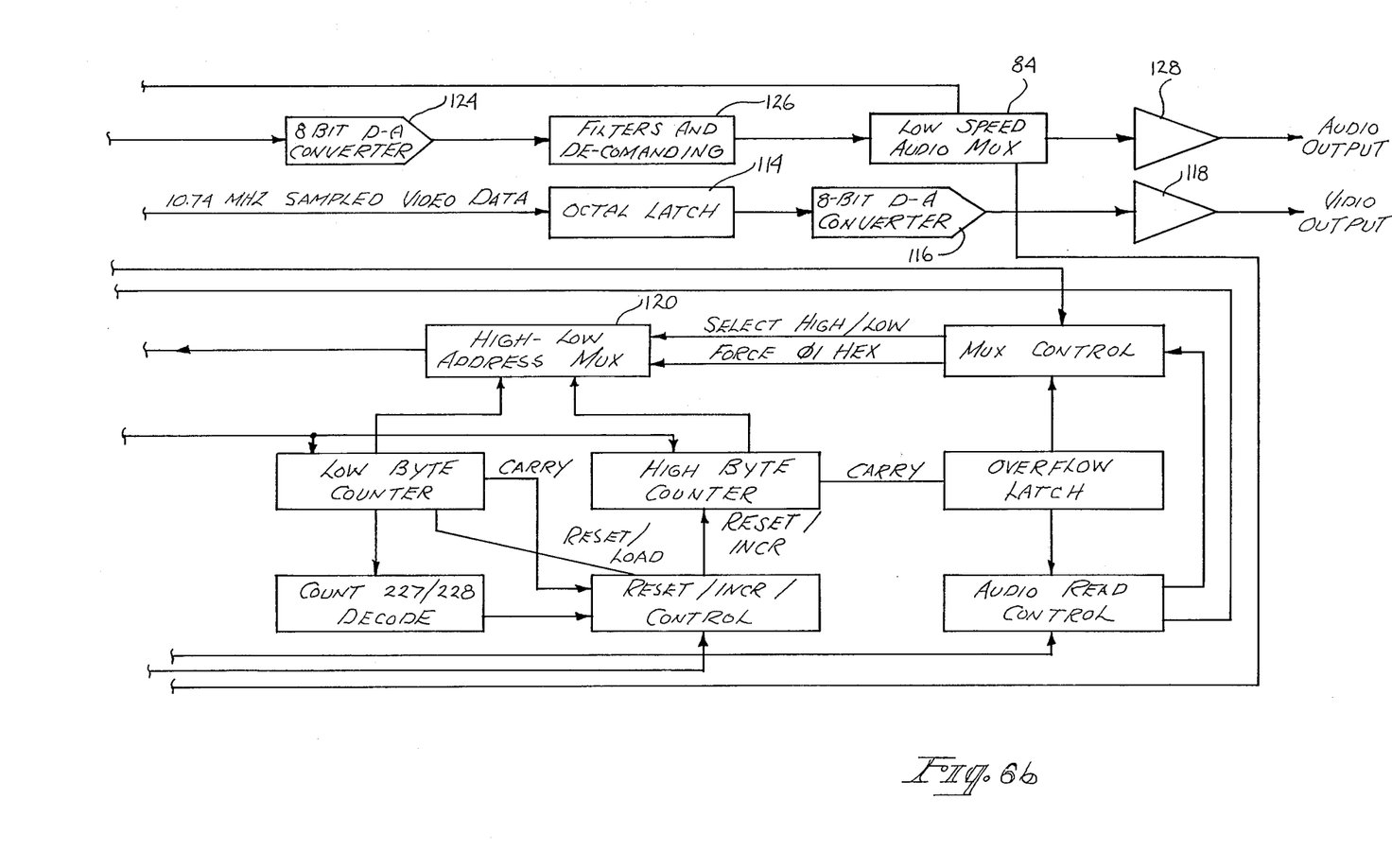
Figure 6D:
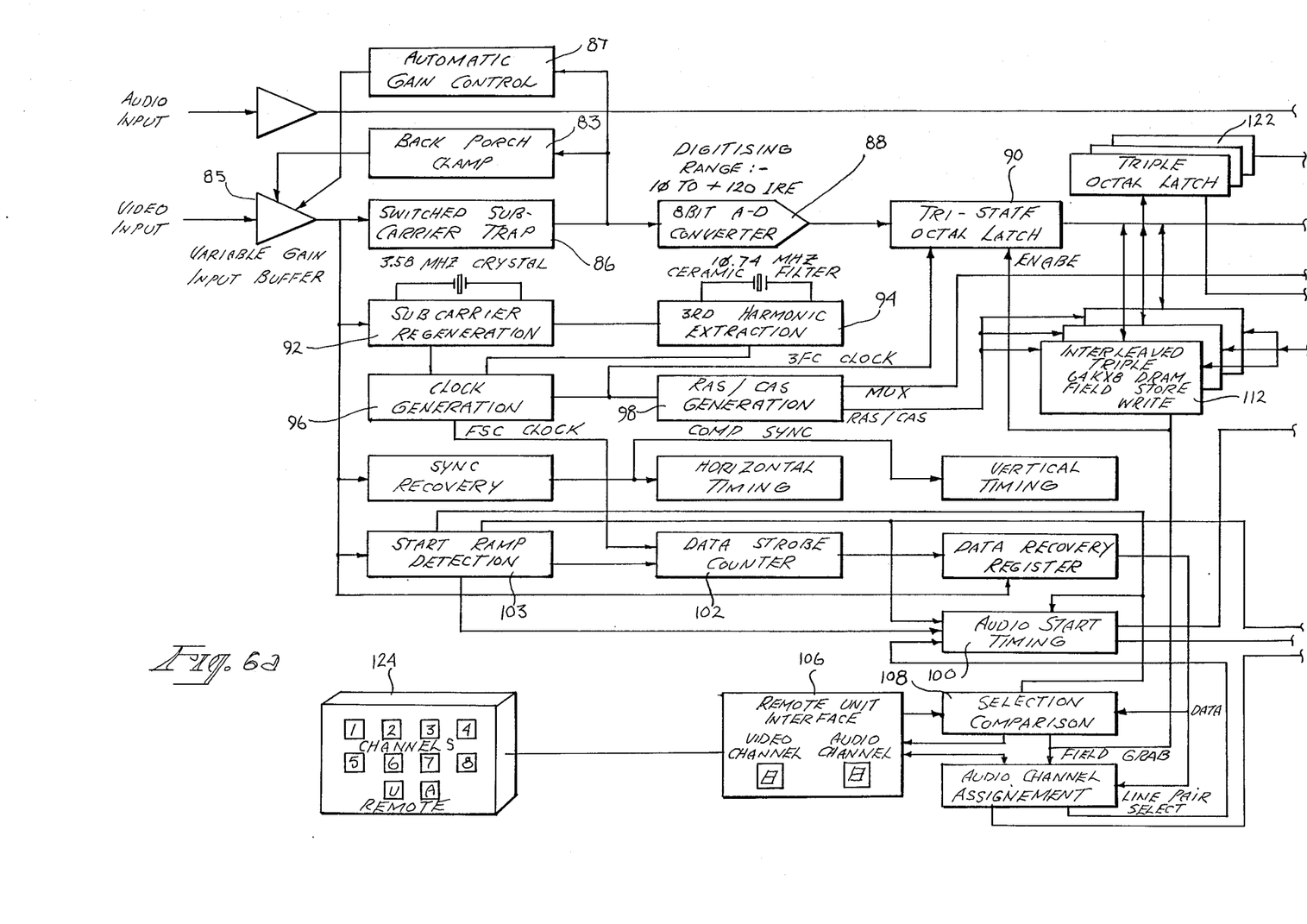

Now referring to FIG. 6 the block diagram for one recovery system may be seen. The diagram shown is for a system wherein a user may select any of the eight video channels with associated audio channel, alternatively may select any video channel and any audio channel even though the two are not necessarily associated, or select a freeze frame. Such a system may be used by way of example, for sporting events, as mentioned before, allowing the user to follow the main action, though when desired, to view the score board, slow motion playbacks of critical plays, etc.

As shown in FIG. 6, the conventional television audio signal, being an additional selectable audio channel, is provided through amplifier 82 directly to multiplexer 84. The video signal, which includes the compressed audio and digital data on lines 22 through 29 thereof, is processed in various ways. During the back porch of the horizontal sync signal, when the signal level should be at zero IRE (black), the back porch clamp 83 adjusts the zero offset of the video amplifier 85 to establish the zero reference. Subsequently, during the reference pedestal period of approximately 10 SCC when the reference level is at +100 IRE (see FIG. 3), the automatic gain control circuit 87 adjusts to the gain of the video amplifier 85 so that the output thereof is at the desired +100 IRE, thereby reestablishing the reference level and scale factor of the recovered signal.

A switched subcarrier trap 86 is switched in during the active video portion of lines 22 through 29 to strip the subcarrier from the video signal, with an eight bit analog to digital converter 88 digitizing the analog video signal, which is then temporarily stored in the tristate octal latch 90, the analog to digital converter 88 operating at 10.74 mHz (3FSC). Also the 3.58 mHz subcarrier is recovered by the subcarrier regeneration circuit 92, and the third harmonic extracted therefrom by circuit 94 to provide the reference signals to clock circuit 96, which controls the row address strobe and column address strobe generator 98, the audio start timing circuit 100 and the data strobe counter 102. In normal operation a user would select one of the eight video channels through remote control 104, which provides the selected channel through the remote unit interface 106 to a selection comparison circuit 108. Provided as the other input to the selection comparison circuit is the current field identification being held in the data recovery register 110, having been recovered from the video signal using appropriate horizontal and vertical timing references. When a selected video channel and the current video channel as held in the data recovery register 110 agree, indicating that the next field will be a field of the selected channel, the video channel indication on the remote unit interface 106 is updated and a field grab signal is provided to the tristate octal latch 90 for providing the digitized video signal for the next field to the field store memory 112. In a similar manner the audio channel associated with the video channel is stored in the audio channel assignments circuit 114 and the audio channel indication on the remote unit interface 106 is updated.

During a selected field time the video signal for that field is coupled through tristate latch 90 and latch 114 to a digital to analog converter 116 which converts the video signal to analog form for output by video amplifier 118 This output represents the full video signal with the subcarrier (except for lines 22 through 29) and horizontal and vertical sync signals. At the same time the digital output of the tristate latch 90 is stored in memory 112. During nonselected field times as indicated by the selection comparison circuit 108, the tristate latch is put in its output floating state, with the data previously stored in memory 112 for a selected field being output to the octal latch 114 to replicate that field until a current field matches the selected field.

For each field, the audio start timing circuit 100 utilizes the horizontal and vertical sync signals from the horizontal timing and vertical timing circuits, respectively, to keep track of the current field line. When that field line corresponds to a line associated with the currently selected audio channel as indicated by the audio channel assignment circuit 113, the start ramp detection circuit 103 is initiated by the audio start timing circuit 100 during the window between the end of the horizontal blanking interval and the reference pedestal ramp. Thus the start ramp detection circuit 103 will detect the +50 IRE level of the reference pedestal ramp for each of the two lines of the selected audio channel, with the audio start timing circuit 100 responding to that detection to time and control the counters for the loading of the memory as hereinbefore described.

Having now generally described the function of the circuit of FIG. 6, further details of the memory 112 and the control and operation thereof can be described. The memory is an interleaved triple memory so that three points may be stored or retrieved on each clocking thereof For the first 29 lines of each field, whether the selected field or not, the digitized signal is passed directly from latch 90 to latch 114 to provide the video output through amplifier 118. For the first 21 of such lines and for the six lines of the three nonselected audio channels, nothing is stored in the memory. However for the first line of the selected audio channel the digitized video signal is stored in the memory starting with the zero address at the start of the audio information in that line. Clocking of the memory at the subcarrier rate, properly phased, results in the storage of the three samples per subcarrier cycle, or 393 sample points in the memory locations of zero through 130. Thereafter, even though the address counters keep running, an address of 131 is jam loaded into the counters at the start of the analog data on the next line. Thereafter the counters continue to run, resulting in the storage not only of the analog data for the second line but also the video image information and the horizontal and vertical sync signals. In that regard the low byte counter is counting pixels along any scan line, with the high byte counter counting scan lines (while the selected audio channel is stored for each field as described, the video image information, e.g., the information for lines 30 on, is only stored during the selected field time, though of course it is output with the same addressing scheme during nonselected field times). With the foregoing memory organization and addressing, the audio information is organized sequentially at addresses corresponding to the scan line. Accordingly, when the stored video information is being output from the memory, the high order byte will indicate the scan line and accordingly, if used as an address itself, will address the audio data for that line. This is controlled by the high-low address multiplexer 120, so that the three audio samples for that line are appropriately output to the triple octal latch 122 for converting to an analog signal by the digital to analog converter 124 and filtering and decompanding by circuit 126 to provide a selected audio channel signal to the audio multiplexer 84. Since the number of lines per field exceeds 256, provision is made to retain the carry bit to allow counting above 256 as required.

It will be apparent from the foregoing and FIG. 6 that any of the four audio channels as well as the conventional television audio channel may be selected for output through amplifier 128, the multiplexer 84 making the final selection between one of the channels embedded in the video signal and the conventional audio channel. Also, while in the foregoing description, selection of one of the eight video channels automatically resulted in the selection of the associated audio channel, a video channel or an audio channel could be independently selected by depressing either the V button or the A button respectively, on the remote control prior to the selection of the channel. For instance, if the V button is pushed prior to the selection of the channel, the updated video channel information is provided to the selection comparison circuit 108, but the audio channel assignment circuit 13 will not accept an update of its contents to reflect the audio channel normally associated with the commanded video channel. Similarly, commanding a specific audio channel force loads the audio channel assignment circuit 113 independent of the video selection in the selection comparison circuit 108. When both are pressed, a freeze field is created.

The use of lines 22 through 29 for the combined digital data and analog information as hereinbefore described is preferred for broadcast purposes, as it does not interfere with the still higher lines used for closed caption purposes and used by the broadcast studio themselves for various network purposes, and further, does not interfere with normal television receivers. However, various video cassette recorders have different characteristics and some recorders have some cross talk between signals on adjacent lines. In the case of video information, adjacent lines have substantially similar video information so that some cross talk is not of any great importance. However, where adjacent lines are used for independent audio channels, the cross talk may be objectionable, as voice on one channel will appear on another channel at times when that channel should be quiet. This will be the case for the line allocation illustrated in FIG. 2, as line 23 contains the second line of Channel A audio information whereas line 24 contains the first line of Channel B, etc. This problem is not significant with respect to adjacent lines of the same audio channel, as the amount of cross talk is not large and is not readily audibly detectable since it is in effect only a percentage of the same signal delayed slightly as opposed to a percentage of an entirely different signal which may be large at the time the channel in which the cross talk occurs is supposed to be quiet. Thus for recording purposes the two line segments making up the entire audio signal for an entire field may be adjacent each other, but are preferably separated from the adjacent channels by at least one line carrying the equivalent of an audio signal at a quiet level. On the other hand, the lines above line 22 are not used in prerecorded video cassettes and accordingly, for recording purposes, it is convenient to use lines 19 and 20 for one audio channel, keeping the unused line 21 quiet, lines 22 and 23 for a second audio channel with line 24 held at a quiet level, lines 25 and 26 for the third audio channel with line 27 held at a quiet level, and lines 28 and 29 for the fourth audio channel, with the first pictured line following thereafter. Such a line allocation for prerecorded video cassettes essentially eliminates the cross talk problem for all video cassette machines, allowing a prerecorded video cassette to be used for the same purposes as a broadcast signal.

There has been described herein a new and unique method and apparatus for providing identification, other digital data and multiple audio tracks in video systems such as interleaved video systems. In accordance with the present invention the digital data and audio or analog information is embedded in the video signal in a manner compatible with conventional TV receivers, as well as being compatible with video signal processing and distribution techniques. While the invention has been disclosed and described herein with respect to a preferred embodiment thereof, it will be understood by those skilled in the art that various changes in form and detail may be made therein without departing from the spirit and scope thereof.

I claim:

1. A method of providing multiple analog signals in a composite signal of a video system comprising the steps of:
   (a) for each of a plurality of analog signals, sampling such analog signal a predetermined number of times for each video scan line to provide a plurality of sampled analog signals for each video field;
   (b) for each sampled analog signal, and for each video field, providing as a video signal for at least one predetermined video scan line associated with such analog signal, the sampled analog signal associated with such analog signal and such field at a rate wherein the sampled analog signal will be within the respective said at least one predetermined video scan line associated with said analog signal;
   whereby said plurality of analog signals may be recorded, transmitted and otherwise manipulated as video signals on a plurality of scan lines of each field of the composite signal of the video system.

2. The method of claim 1 wherein step (b) the rate at which the sampled analog signals are provided for each field is a rate referenced to the chroma subcarrier frequency of the video system.

3. The method of claim 2 wherein the rate at which the sampled analog signals are provided for each field is a multiple of the chroma subcarrier frequency of the video system.

4. The method of claim 3 wherein, in step (b) of claim 1, said at least one predetermined video scan line associated with such analog signal comprises two video scan lines associated with such analog signal.

5. The method of claim 3 wherein each of said predetermined video scan lines is in the field line range of 22 to 29.

6. The method of claim 1 wherein each of said predetermined video scan lines is in the field line range of 22 to 29.

7. The method of claim 1 wherein each of said predetermined video scan lines is above the normally viewable portion of the video image, whereby the analog signal will not be viewable on an ordinary television receiver.

8. The method of claim 1 wherein in step (b), for the at least one predetermined video scan line associated with such analog signal, the sampled analog signals is provided as the video signal starting a predetermined time after a reference video signal reaches a predetermined reference level.

9. The method of claim 8 wherein the reference level is between the black and the white levels, and wherein video signal reaches the predetermined reference level from a whiter level a predetermined length of time after the horizontal blanking interval.

10. The method of claim 1 further including providing digital signals in the signal of a video system comprising the additional step of:
   (c) for each predetermined video scan line associated with each analog signal, providing as a video signal for part of the respective video scan line, a plurality of digital signals, whereby the respective scan lines of the signal of the video system will contain both analog and digital signal information.

11. A method of providing multiple analog signals in a composite signal of a video system comprising the steps of:
(a) for each of a plurality of analog signals, dividing the analog signal into signal segments, each having a time duration substantially equal to one field time of the video system;
(b) for each analog signal, and for each video field, providing as a video signal for at least one predetermined video scan line associated with such analog signal, one of said analog signal segments at a substantially increased rate wherein the analog signal for each field will be within said at least one predetermined video scan line associated with said analog signal;
whereby said plurality of analog signals may be recorded, transmitted and otherwise and otherwise manipulated as video signals on a plurality of scan lines of each field of the composite signal of the video system.

12. The method of claim 10 wherein, for each respective video scan line, the plurality of digital signals precedes the sampled analog signals.

13. The method of claim 1 wherein the analog signals are audio signals.

14. A method of providing multiple analog signals in the signal of a video system comprising the steps of:
(a) for each analog signal, dividing the analog signal into signal segments, each having a time duration substantially equal to one field time of the video system;
(b) for each analog signal, and for each video field, providing as a video signal for at least one predetermined video scan line associated with such analog signal, one of said analog signal segments at a substantially increased rate wherein the plurality of analog signals for each field will each be within the video signal of said at least one predetermined video scan line associated with said analog signal;
whereby a plurality of analog signals may be recorded, transmitted and otherwise manipulated as video signals on a plurality of scan lines of each field of the signal of the video system.

15. The method of claim 14 wherein said at least one predetermined video scan line associated with such analog signal comprises two video scan lines associated with such analog signal.

16. The method of claim 14 wherein each of said predetermined video scan lines is in the field line range of 22 to 29.

17. The method of claim 14 wherein each of said predetermined video scan lines is above the normally viewable portion of the video image, whereby the analog signal will not be viewable on an ordinary television receiver.

18. The method of claim 17 wherein in step (b), for the at least one predetermined video scan line associated with such analog signal, the analog signal segment is provided as the video signal starting a predetermined time after a reference video signal reaches a predetermined reference level.

19. The method of claim 18 wherein the reference level is between the black and the white levels, and wherein video signal reaches the reference level from a whiter level a predetermined length of time after the horizontal blanking interval.

20. The method of claim 14 further including providing digital signals in the signal of a video system comprising the additional step of:
(c) for each predetermined video scan line associated with each analog signal, providing as a video signal for part of the respective video scan line, a plurality of digital signals, whereby the respective scan lines of the signal of the video system will contain both analog and digital signal information.

21. The method of claim 20 wherein the rate at which the plurality of digital signals is provided is a rate referenced to the chroma subcarrier frequency of the video system.

22. The method of claim 20 wherein, for each respective video scan line, the plurality of digital signals precedes the sampled analog signals.

23. Apparatus for detecting any of multiple analog signals in a video signal comprising:
first means responsive to the video signal for recovering the chroma subcarrier therefrom;
second means responsive to the video signal for detecting the occurrence of predetermined lines of each video field
third means coupled to said first and second means and responsive to the video signal for providing predetermined portions of said predetermined lines as at least one of said multiple analog signals.

24. The apparatus of claim 23 further including fourth means for extending the time base of said predetermined portions of said predetermined lines to occupy one full video field time, whereby each of said multiple analog signals is extended in time to provide a continuous analog signal.

25. The apparatus of claim 24 wherein said third means is a means for sampling the video signal at a sample rate referenced to the chroma subcarrier frequency and said fourth means comprises an analog to digital converter, means for converting said samples to digital samples, a memory means for temporary storage of said digital samples at said sample rate and for providing the stored digital samples to a digital to analog converter at a much slower rate, said digital to analog converter being a means to convert said digital samples to a continuous analog signal.

26. The apparatus of claim 25 wherein said third means is a means for sampling the video signal at a sample rate which is a multiple of the chroma subcarrier.

27. The apparatus of claim 26 wherein said second means is a means for detecting the occurrence of predetermined lines of each video field above the normally viewable lines of each field.

28. The apparatus of claim 27 wherein said second means is a mean for detecting the occurrence of predetermined lines of each video field in the range of 22 to 29.

29. The apparatus of claim 23 wherein said third means is a means for providing said predetermined portions of said predetermined lines a predetermined time after said video signal passes through a predetermined reference level.

30. The apparatus of claim 29 wherein said third means is responsive to said video signal passing through said predetermined reference level a predetermined length of time after the horizontal blanking interval.

31. The apparatus of claim 30 wherein said third means is responsive to said video signal through a fourth means, said fourth means being responsive to predetermined portions of said video signal to provide a video signal to said third means adjusted in offset and scale factor.

32. The apparatus of claim 24 for also detecting multiple digital signals in a video signal further comprised of fifth means coupled to said first and second means and responsive to the video signal for sampling at a predetermined sample rate, predetermined portions of said predetermined lines to recover digital data therefrom.

33. The apparatus of claim 32 wherein, for each respective predetermined line, said fifth means samples the video signal at a predetermined rate prior to said third means providing predetermined portions of said predetermined lines as at least one of said multiple analog signals.

34. The apparatus of claim 33 wherein said third means is a means for sampling the video signal at a sample rate which is a multiple of the chroma subcarrier frequency, and said fifth means is a means for sampling the video signal at a rate which is a submultiple of the chroma subcarrier rate.

35. The apparatus of claim 34 wherein said fourth means comprises an analog to digital converter, means for converting said samples to digital samples, a memory means for temporary storage of said digital samples at said sample rate and for providing the stored digital samples to a digital to analog converter at a much slower rate, said digital to analog converter being a means to convert said digital samples to a continuous analog signal.

36. Apparatus for detecting digital data and any of multiple analog signals in predetermined lines of a video signal comprising
first means responsive to the video signal for recovering the chroma subcarrier therefrom;
second means responsive to the video signal for detecting the occurrence of at least some of said predetermined lines of each video field;
third means for providing a timing reference signal responsive to the video signal passing through a predetermined reference level within a predetermined time window after the horizontal blanking interval, at least for said at least some of said predetermined lines;
fourth means responsive to said first, second and third means for sampling the video signal a first predetermined number of chroma subcarrier cycles after the occurrence of said timing reference signal to provide a digital data bit, and for sampling the video signal each N chroma subcarrier cycles thereafter for a second predetermined number of times to provide for the respective predetermined line, a plurality of digital data bits; and
fifth means responsive to said first, second and third means for providing predetermined portions of said at least some of said predetermined lines as at least one of said multiple analog signals.

37. The apparatus of claim 36 further including sixth means for extending the time base of said predetermined portions of said predetermined lines to occupy one full video field time, whereby each of said multiple analog signals is extended in time to provide a continuous analog signal.

38. The apparatus of claim 37 wherein said fifth means is a means for sampling the video signal at a sample rate referenced to the chroma subcarrier frequency and said sixth means comprises an analog to digital converter, means for converting said samples to digital samples, a memory means for temporary storage of said digital samples at said sample rate and for providing the stored digital samples to a digital to analog converter at a much slower rate, said digital to analog converter being a means to convert said digital samples to a continuous analog signal.

39. The apparatus of claim 38 wherein the sample rate referenced to the chroma subcarrier frequency is an integer times the chroma subcarrier frequency.

40. The apparatus of claim 36 wherein said fourth and fifth means are responsive to said video signal through a sixth means, said sixth means being responsive to predetermined portions of said video signal to provide a video signal to said fourth and fifth means adjusted in offset and scale factor.

41. The apparatus of claim 36 wherein N is 4, and the total number of samples per line is 8.

42. The apparatus of claim 41 wherein said predetermined lines are in the range of field lines 22 through 29.

43. The apparatus of claim 42 wherein the number of field lines for each analog signal is two, and wherein said fifth means is a means for sampling the video signal at a sample rate referenced to the chroma subcarrier frequency and said sixth means comprises an analog to digital converter, means for converting said samples to digital samples, a memory means for temporary storage of said digital samples at said sample rate and for providing the stored digital samples to a digital to analog converter at a much slower rate, said digital to analog converter being a means to convert said digital samples to a continuous analog signal.

* * * * *